United States Patent
Singh et al.

(10) Patent No.: US 9,916,660 B2
(45) Date of Patent: Mar. 13, 2018

(54) VEHICLE VISION SYSTEM WITH CALIBRATION ALGORITHM

(71) Applicant: MAGNA ELECTRONICS INC., Auburn Hills, MI (US)

(72) Inventors: Jagmal Singh, Aschaffenburg (DE); Sebastian Pliefke, Sailauf (DE); Holger Hess, Aschaffenburg (DE)

(73) Assignee: Magna Electronics Inc., Auburn Hills, MI (US)

( * ) Notice: Subject to any disclaimer, the term of this patent is extended or adjusted under 35 U.S.C. 154(b) by 169 days.

(21) Appl. No.: 14/996,571

(22) Filed: Jan. 15, 2016

(65) Prior Publication Data

US 2016/0210750 A1 Jul. 21, 2016

Related U.S. Application Data

(60) Provisional application No. 62/104,288, filed on Jan. 16, 2015.

(51) Int. Cl.
| | |
|---|---|
| *H04N 7/18* | (2006.01) |
| *G06T 7/00* | (2017.01) |
| *G06T 3/00* | (2006.01) |
| *G06T 5/00* | (2006.01) |
| *G06T 7/80* | (2017.01) |
| *G06K 9/00* | (2006.01) |

(52) U.S. Cl.
CPC .......... *G06T 7/0018* (2013.01); *G06T 3/0062* (2013.01); *G06T 5/006* (2013.01); *G06T 7/80* (2017.01); *H04N 7/181* (2013.01); *G06K 9/00791* (2013.01); *G06T 2207/30208* (2013.01); *G06T 2207/30252* (2013.01)

(58) Field of Classification Search
None
See application file for complete search history.

(56) References Cited

U.S. PATENT DOCUMENTS

| 4,961,625 A | 10/1990 | Wood et al. |
| 4,966,441 A | 10/1990 | Conner |

(Continued)

FOREIGN PATENT DOCUMENTS

| EP | 0353200 | 1/1990 |
| EP | 0361914 | 2/1993 |

(Continued)

OTHER PUBLICATIONS

Achler et al., "Vehicle Wheel Detector using 2D Filter Banks," IEEE Intelligent Vehicles Symposium of Jun. 2004.

(Continued)

*Primary Examiner* — Eileen Adams
(74) *Attorney, Agent, or Firm* — Gardner, Linn, Burkhart & Flory, LLP

(57) ABSTRACT

A vision system of a vehicle includes a camera configured to be disposed at a vehicle so as to have a field of view exterior of the vehicle. The camera may include a fisheye lens. An image processor is operable to process image data captured by the camera. The vision system provides enhanced camera calibration using a monoview noncoplanar three dimensional calibration pattern. The system may include a plurality of cameras configured to be disposed at the vehicle so as to have respective fields of view exterior of the vehicle.

16 Claims, 6 Drawing Sheets

(56) References Cited

U.S. PATENT DOCUMENTS

| | | |
|---|---|---|
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,148,014 A | 9/1992 | Lynam |
| 5,166,681 A | 11/1992 | Bottesch et al. |
| 5,177,606 A | 1/1993 | Koshizawa |
| 5,182,502 A | 1/1993 | Slotkowski et al. |
| 5,193,029 A | 3/1993 | Schofield |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,445,287 B1 | 9/2002 | Schofield et al. |
| 6,477,464 B2 | 11/2002 | McCarthy et al. |
| 6,498,620 B2 | 12/2002 | Schofield et al. |
| 6,515,378 B2 | 2/2003 | Drummond et al. |
| 6,516,664 B2 | 2/2003 | Lynam |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |

(56) References Cited

U.S. PATENT DOCUMENTS

| | | |
|---|---|---|
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,227,459 B2 | 6/2007 | Bos et al. |
| 7,227,611 B2 | 6/2007 | Hull et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,375,803 B1 | 5/2008 | Bamji |
| 7,380,948 B2 | 6/2008 | Schofield et al. |
| 7,388,182 B2 | 6/2008 | Schofield et al. |
| 7,423,821 B2 | 9/2008 | Bechtel et al. |
| 7,425,076 B2 | 9/2008 | Schofield et al. |
| 7,526,103 B2 | 4/2009 | Schofield et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,881,496 B2 | 2/2011 | Camilleri |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,100,568 B2 | 1/2012 | DeLine et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,534,887 B2 | 9/2013 | DeLine et al. |
| 8,553,088 B2 | 10/2013 | Stein et al. |
| 2002/0005778 A1 | 1/2002 | Breed |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1 | 12/2012 | Vico |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0028861 A1* | 1/2014 | Holz ............... H04N 5/23277 348/208.4 |
| 2014/0043473 A1 | 2/2014 | Rathi et al. |
| 2014/0063254 A1 | 3/2014 | Shi et al. |
| 2014/0098229 A1 | 4/2014 | Lu et al. |
| 2014/0104424 A1* | 4/2014 | Zhang ................ B60R 1/00 348/148 |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |

FOREIGN PATENT DOCUMENTS

| | | |
|---|---|---|
| EP | 0640903 | 3/1995 |
| EP | 0697641 | 2/1996 |
| EP | 1115250 | 7/2001 |
| EP | 2377094 | 10/2011 |
| EP | 2667325 | 11/2013 |
| GB | 2233530 | 9/1991 |
| JP | S5539843 | 3/1980 |
| JP | S58110334 | 6/1983 |
| JP | 6216073 | 4/1987 |
| JP | 6272245 | 5/1987 |
| JP | S62-131837 | 6/1987 |
| JP | 01123587 | 5/1989 |
| JP | H1168538 | 7/1989 |
| JP | H236417 | 8/1990 |
| JP | 03099952 | 4/1991 |
| JP | 6227318 | 8/1994 |
| JP | 07105496 | 4/1995 |
| JP | 2630604 | 7/1997 |
| JP | 200274339 | 3/2002 |
| JP | 20041658 | 1/2004 |
| WO | WO1994019212 | 2/1994 |
| WO | WO1996038319 | 12/1996 |
| WO | WO2012139636 | 10/2012 |
| WO | WO2012139660 | 10/2012 |
| WO | WO2012143036 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.

Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Franke et al., "Autonomous driving approaches downtown", Intelligent Systems and Their Applications, IEEE 13 (6), 40-48, Nov./Dec. 1999.

(56) References Cited

OTHER PUBLICATIONS

IEEE 100—The Authoritative Dictionary of IEEE Standards Terms, $7^{th}$ Ed. (2000).

Kastrinaki et al., "A survey of video processing techniques for traffic applications".

Philomin et al., "Pedestrain Tracking from a Moving Vehicle".

Sahli et al., "A Kalman Filter-Based Update Scheme for Road Following," IAPR Workshop on Machine Vision Applications, pp. 5-9, Nov. 12-14, 1996.

Scaramuzza, David E.,"Omidirectional Vision: From Calibration to Robot Motion Estimation," A dissertation submitted to Eth Zurich, M.S. Electronic Engineering, Universita di Perugia, Italy, 2008.

Sun et al., "On-road vehicle detection using optical sensors: a review", IEEE Conference on Intelligent Transportation Systems, 2004.

Tsai, Robert Y., "A Versatile Camera Calibration Technique for High-Accuracy 3D Machine Vision Metrology Using Off-the-Shelf TV Cameras and Lenses," IEEE, 1987.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Van Leeuwen et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Vlacic et al. (Eds), "Intelligent Vehicle Technologies, Theory and Applications", Society of Automotive Engineers Inc., edited by SAE International, 2001.

Zheng et al., "An Adaptive System for Traffic Sign Recognition," IEEE Proceedings of the Intelligent Vehicles '94 Symposium, pp. 165-170 (Oct. 1994).

\* cited by examiner

VEHICLE VISION SYSTEM WITH CALIBRATION ALGORITHM

CROSS REFERENCE TO RELATED APPLICATION

The present application claims the filing benefits of U.S. provisional application Ser. No. 62/104,288, filed Jan. 16, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides an enhanced calibration of the camera or cameras, as discussed below.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
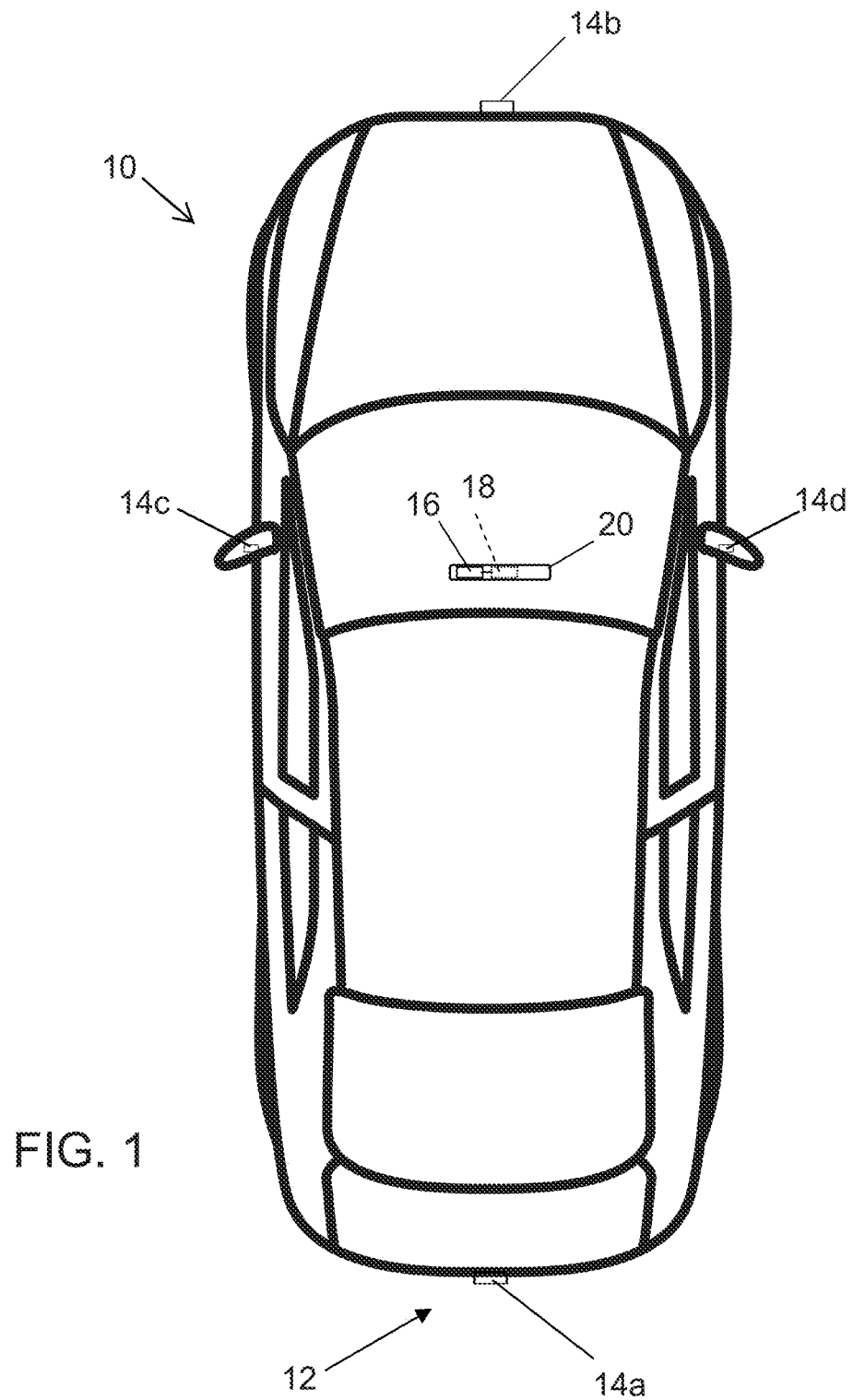
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Intrinsic camera calibration (IC) is an integral and essential part of camera based platforms, such as a platform project that uses a fisheye lens camera to facilitate a wide field of view of about 205 degrees. Among several available open-source libraries for IC, Davide Scaramuzza's omnidirectional camera calibration (OCamCalib) library written in Matlab programming language is one of the few implementations which are taking care of lenses with large radial distortion such as fisheye lens cameras (see Scaramuzza, "Omnidirectional Vision: From Calibration to Robot Motion Estimation", Dissertation submitted to Eth Zurich for the degree of Doctor of Science, Diss. Eth No. 17635, which is hereby incorporated herein by reference in its entirety). The OCamCalib model describes the camera imaging process in terms of a Taylor polynomial expansion, coefficients of which are the intrinsic camera calibration parameters.

The system uses multiple-view coplanar points (such as in chessboard-like pattern) for calibration of intrinsic parameters of a camera. The system of the present invention extends the OCamCalib method for calibrating a camera using monoview non-coplanar (3-dimensional) points distributed on a sphere or semi-sphere.

Acronyms:
IC Intrinsic Camera Calibration
FOV Field of View
OCamCalib Omnidirectional Camera Calibration
1D One dimensional
2D Two dimensional
3D Three dimensional
SSRE Sum of Squared Re-projection Errors
SVD Singular Value Decomposition Theoretical Background of the Omnidirectional Camera Calibration:

A lens which covers a hemisphere field of about 180 degrees is usually called a fisheye lens. The present invention presents intrinsic parameter calibration of fisheye cameras is based on OCamCalib model. The OCamCalib model is based on a unified model for central panoramic systems. This model is defined only for the central camera systems.

Geometry of Omnidirectional Cameras

The below summarizes the geometrical considerations of omnidirectional cameras, such as described in Diss. Eth No. 17635. The fisheye lens camera is the special case of an omnidirectional camera. So, the general formulation for the omnidirectional cameras will also satisfy formulations for the fisheye lens cameras.

The Omnidirectional Camera Model

The projection equation for a standard camera with normal FOV can be written as:

$$\lambda x = P \cdot X \quad (1)$$

where $X=[X,Y,Z]$ are the world-coordinates of the scene point, $x=[x,y,1]$ are the normalized image coordinates of that scene point, and $\lambda$ is an arbitrary depth scale factor. Projection matrix $P \in \mathbb{R}^{3 \times 4}$ relates the camera reference frame and the world reference frame with $P=\acute{A}[R|T]$, where $R \in SO(3)$ is the rotation matrix and $T \in \mathbb{R}^3$ is the translation vector. For an ideal perspective camera, the camera intrinsic matrix $\acute{A}$ is identity matrix. This projection equation is invalid for the omnidirectional camera with a FOV larger than about 180 degrees. The projection equation for the omnidirectional rather follows a spherical model, written as:

$$\lambda q = P \cdot X, \; \lambda > 0 \quad (2)$$

Figure 2:
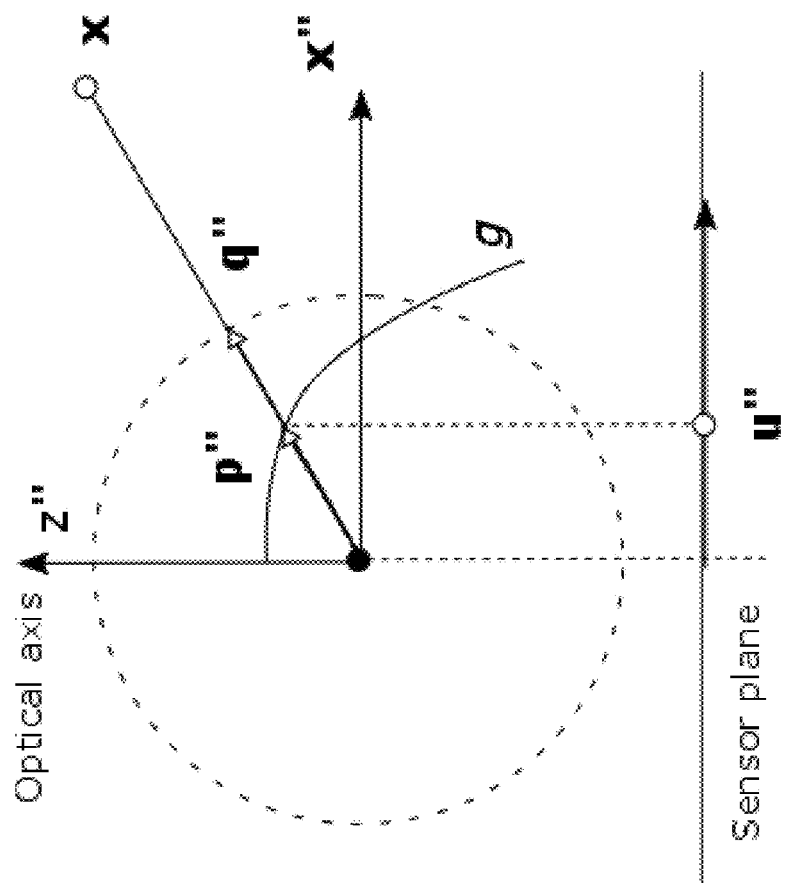
FIG. 2 shows the mapping of a scene point x onto the sensor plane to a point u"

Here, $q=[x,y,z]$ is the unit vector on projection sphere. As shown in FIG. 2, a scene point X is shown as observed through an omnidirectional camera (such as, for example, a fisheye camera or hyperbolic mirror).

Following the spherical model of Eq. (2), a vector p" in the same direction as q always exists, which is mapped on the sensor plane as u", collinear with x". This mapping can be formalized as follows:

$$p'' = \begin{bmatrix} h(\|u''\|)(u'') \\ g(\|u''\|) \end{bmatrix} \quad (3)$$

Figure 3:
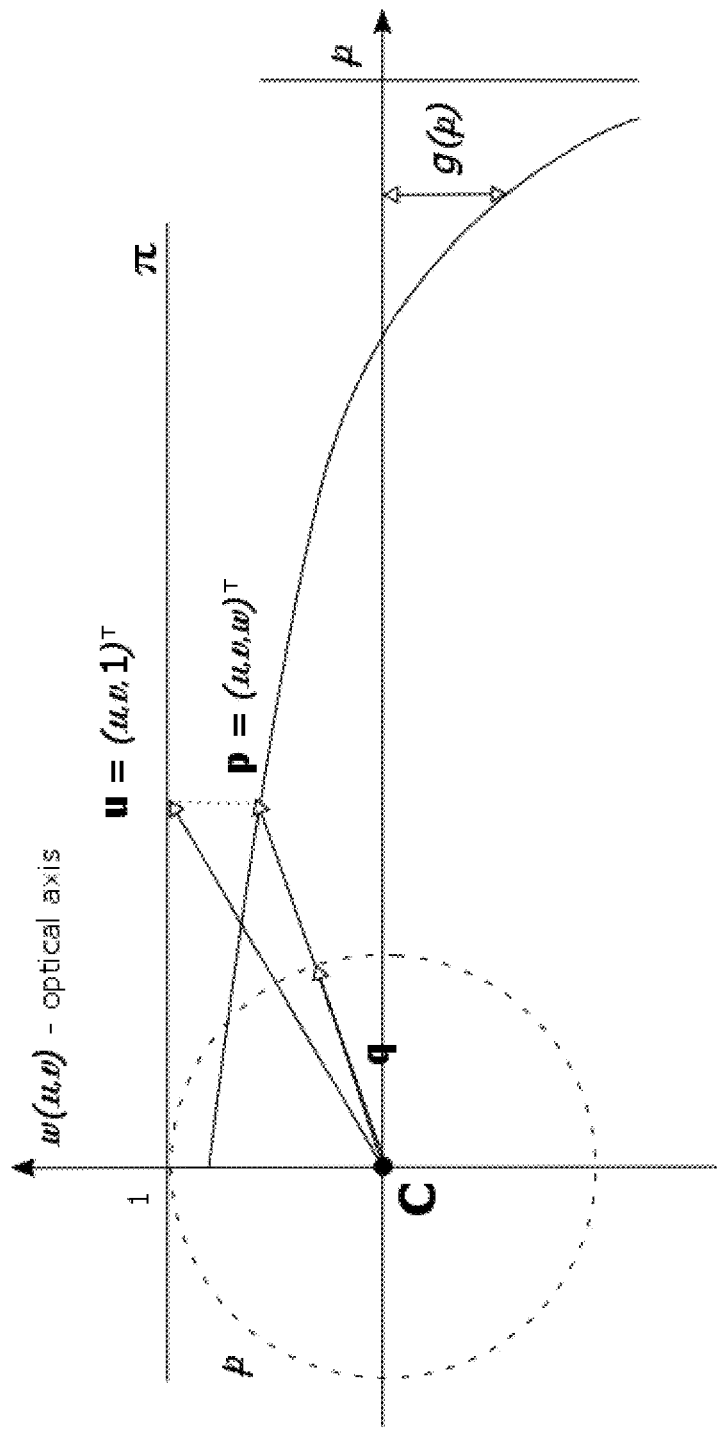
FIG. 3 shows a geometrical interpretation of fisheye lens projection, with mapping of the vector q onto the sensor plane 7 through the projection function $g(\rho)$.

Here, g and h are the functions depending upon the type of lens (e.g. equidistant, equisolid etc.) for the fisheye lens cameras and type of mirror (e.g. parabolic, hyperbolic, elliptical) for the mirror-based camera systems. For the fisheye case, the function h is always equal to 1, i.e. the vector p" is mapped orthographically to the point u" on the sensor plane. Another geometrical interpretation for this mapping is shown in FIG. 3.

Projection onto Camera Plane

When considering an imaging process in a general central camera model, two distinct reference systems are identified: the camera image plane and the sensor plane. The sensor plane can be considered as a hypothetical plane orthogonal to the (fisheye) lens axis and with its origin at the camera optical center. In realistic scenarios, there exists an angular misalignment between the camera image plane and the sensor plane. This misalignment is taken care by adding a three degree-of-freedom rotation $R_c \in SO(3)$ to the camera model. Furthermore, non-rectangularity of the grid where actually the pixels are located in digitization process is also required to be considered, which is corrected by introduction of an intrinsic parameter matrix $K_c \in \mathbb{R}^{3 \times 3}$. Combining both, a homography transformation from the sensor plane to the camera plane is obtained by $H_c=K_c R_c$.

Figure 4B:
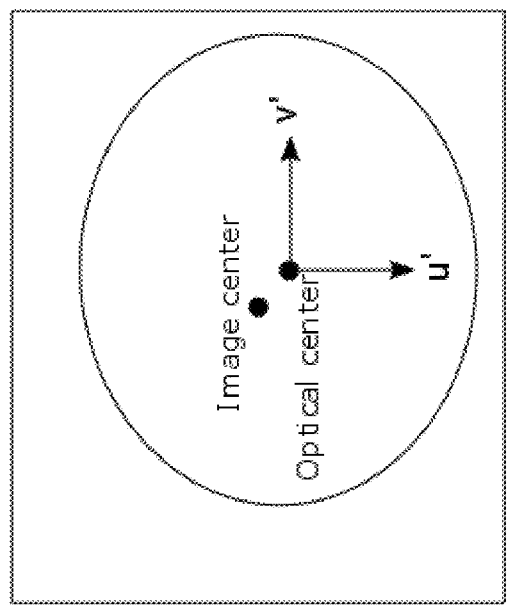
FIG. 4B shows where an optical center and an image center are not aligned, also the tilt of the imager is formulated by Affine transformation.
Figure 4A:
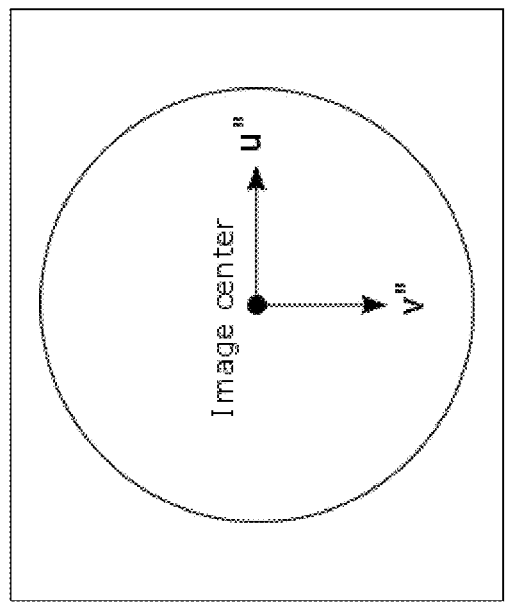
FIG. 4A shows a centered and aligned sensor plane with respect to the image plane.

Assuming a very small misalignment, this homography transformation $H_c$ is approximated well by an Affine transformation that transforms the circular field of view into an elliptical one in the digital image, as shown in FIGS. 4A and 4B.

The approximated homography transformation in form of an Affine transformation is written as:

$$u''=Au'+t \quad (4)$$

Placing the Eq. (4) in the Eq. (3), the complete image mapping model is written as:

$$p'' = \begin{bmatrix} h(\|u''\|)(u'') \\ g(\|u''\|) \end{bmatrix} = \begin{bmatrix} h(\|Au'+t\|)(Au'+t) \\ g(\|Au'+t\|) \end{bmatrix} \quad (5)$$

By combining Equations (2) and (5), the complete projection equation for an omnidirectional camera is written as:

$$\lambda p'' = \lambda \begin{bmatrix} h(\|Au'+t\|)(Au'+t) \\ g(\|Au'+t\|) \end{bmatrix} = P \cdot X \quad (6)$$

It should be noted again that for fisheye lens cameras, the function $h=1$, which further simplifies the formulations.

The Taylor Model

Instead of using two distinct functions h and g, it is sufficient to use only one function g/h. By substituting $h=1$ in the Eq. (6), g has to be determined which satisfies the following projection equation:

$$\lambda p'' = \lambda \begin{bmatrix} u'' \\ g(\|u''\|) \end{bmatrix} = P \cdot X \quad (7)$$

The following polynomial of degree N is proposed g in:

$$g(\|u''\|)=a_0+a_1\|u''\|+a_2\|u''\|^2+ \ldots +a_N\|u''\|^N \quad (8)$$

Where the coefficients $a_0, a_1, \ldots, a_N$ and N are the calibration parameters to be estimated. The polynomial g always satisfies the following condition:

$$\left. \frac{dg}{d\rho} \right|_{\rho=0} = 0 \quad (9)$$

with $\rho=u''$. As a result of this simplification, the condition $a_1=0$ can be imposed, and the Eq. (8) can be written as follows:

$$g(\|u''\|)=a_0+a_2\|u''\|^2+ \ldots +a_N\|u''\|^N \quad (10)$$

Now, the number of calibration parameter to be estimated is reduced to N from N+1. Placing Eq. (10) in the Eq. (5), we obtain the image formation model as:

$$p'' = \begin{bmatrix} h(\|u''\|)(u'') \\ g(\|u''\|) \end{bmatrix} = \begin{bmatrix} u'' \\ a_0+a_2\|u''\|^2+\ldots+a_N\|u''\|^N \end{bmatrix} \text{ with} \quad (11)$$

$$u'' = Au'+t$$

Using Equations (7) and (11), the final projection equation for central omnidirectional camera following the Taylor model is written as:

$$\lambda p'' = \lambda \begin{bmatrix} u'' \\ a_0 + a_2\|u''\|^2 + \ldots + a_N\|u''\|^N \end{bmatrix} = P \cdot X \text{ with} \quad (12)$$

$$u'' = Au' + t$$

In order to calibrate a fisheye lens camera, parameters A, t, $a_0, a_2, \ldots,$ and $a_N$ need to be estimated which satisfy the Equation (12). Here, A and t are the Affine parameters, and $a_0, a_2, \ldots,$ and $a_N$ are the coefficients which describe the shape of imaging polynomial function g.

Camera Calibration Using the Taylor Model and 2D Calibration Pattern

Scaramuzza proposed to estimate the calibration parameters in two stages. First stage estimates the Affine parameters A and t, and the second stages deals with the estimation of coefficients $a_0, a_2, \ldots,$ and $a_N$. The estimation of Affine parameters A and t is based on an iterative procedure. This procedure is initialized assuming that the camera plane and sensor plane coincides, thus the stretch matrix A is set to be an identity matrix I and the translation vector t=0. Correction in A is done later using a nonlinear refinement, and in t by an iterative search algorithm. With the assumptions A=I and t=0, we have u''=u'. Thus the Equation (12) can be written as follows:

$$\lambda p'' = \lambda \begin{bmatrix} u' \\ v' \\ a_0 + a_2\rho'^2 + \ldots + a_N\rho'^N \end{bmatrix} = P \cdot X \quad (13)$$

Where $\rho'=\|u'\|$ and (u',v') are the pixel coordinates of the image point u'. The calibration procedure uses a planar pattern image $I^i$ of known geometry (e.g. a chessboard-like pattern) shown to the camera at several unknown $i^{th}$ positions and orientations. These unknown positions and orientations are related to the coordinate system of the sensor by a rotation matrix $R \in SO(3)$ and a translation vector $T \in \mathbb{R}^3$. R and T are the extrinsic parameters. As the calibration pattern image used is planar, the z-coordinate in the 3D coordinates of the $j^{th}$ points of calibration pattern image $I^i$ (i.e., $M_j^i = [X_j^i, Y_j^i, Z_j^i]$), can be set to zero, that is $Z_j^i = 0$. Assuming corresponding pixel coordinates of $j^{th}$ point of calibration pattern image $I^i$ to be $m_j^i = [u_j^i, v_j^i]$, the Eq. (13) can be rewritten as follows:

$$\lambda_j^i \cdot p_j^i = \lambda_j^i \cdot \begin{bmatrix} u_j^i \\ v_j^i \\ a_0 + a_2\rho_j^{i\,N} + \ldots + a_N\rho_j^{i\,N} \end{bmatrix} = \quad (14)$$

$$P^i \cdot X_j^i = [r_1^i \; r_2^i \; r_3^i \; T^i] \cdot \begin{bmatrix} X_j^i \\ Y_j^i \\ 0 \\ 1 \end{bmatrix} = [r_1^i \; r_2^i \; T^i] \cdot \begin{bmatrix} X_j^i \\ Y_j^i \\ 1 \end{bmatrix}$$

Where $r_1^i, r_2^i,$ and $r_3^i$ are the column vectors of $R^i$, and recall P=[R|T] from the discussions above.

Extrinsic Parameter Estimation

Dependence of the depth scale is eliminated by vector product of Eq. (14) on both sides by $p_j^i$ and we obtain:

$$\lambda_j^i \cdot p_j^i \times p_j^i = p_j^i \times [r_1^i \; r_2^i \; T^i] \cdot \begin{bmatrix} X_j^i \\ Y_j^i \\ 1 \end{bmatrix} = \quad (15)$$

$$0 \triangleq \begin{bmatrix} u_j^i \\ v_j^i \\ a_0 + a_2\rho_j^{i\,2} + \ldots + a_N\rho_j^{i\,N} \end{bmatrix} \times [r_1^i \; r_2^i \; T^i] \cdot \begin{bmatrix} X_j^i \\ Y_j^i \\ 1 \end{bmatrix} = 0$$

Solving the Eq. (15), following three homogeneous equations are obtained for each $j^{th}$ point $p_j^i$ in the $i^{th}$ position and orientation of the planar pattern image $I^i$:

$$v_j^i(r_{31}^i X_j^i + r_{32}^i Y_j^i + t_3^i) - (a_0 + a_2\rho_j^{i\,2} + \ldots + a_N\rho_j^{i\,N})$$
$$(r_{21}^i X_j^i + r_{22}^i Y_j^i + t_2^i) = 0 \quad (16)$$

$$(a_0 + a_2\rho_j^{i\,2} + \ldots + a_N\rho_j^{i\,N})(r_{11}^i X_j^i + r_{12}^i Y_j^i + t_1^i) - u_j^i$$
$$(r_{31}^i X_j^i + r_{32}^i Y_j^i + t_3^i) = 0 \quad (17)$$

$$u_j^i(r_{21}^i X_j^i + r_{22}^i Y_j^i + t_2^i) - v_j^i(r_{11}^i X_j^i + r_{12}^i Y_j^i + t_1^i) = 0 \quad (18)$$

The Eq. (18) is a linear equation in unknowns $r_{11}^i, r_{12}^i, r_{21}^i, r_{22}^i, t_1^i$ and $t_2^i$, which can be written in the vector form for L points of the $i^{th}$ poses of calibration pattern as a following system of equations:

$$M \cdot H = 0. \quad (19) \text{ with}$$

$$M = \begin{bmatrix} -v_1^i X_1^i & -v_1^i Y_1^i & -u_1^i X_1^i & -u_1^i Y_1^i & -v_1^i & u_1^i \\ \vdots & \vdots & \vdots & \vdots & \vdots & \vdots \\ -v_L^i X_L^i & -v_L^i Y_L^i & -u_L^i X_L^i & -u_L^i Y_L^i & -v_L^i & u_L^i \end{bmatrix}, \text{ and} \quad (20)$$

$$H = \begin{bmatrix} r_{11}^i \\ r_{12}^i \\ r_{21}^i \\ r_{22}^i \\ t_1^i \\ t_2^i \end{bmatrix}$$

The solution of the Eq. (19) can be obtained by:

$$\min\|M \cdot H\|^2 = 0, \text{ subject to } \|H\|^2 = 1 \quad (21)$$

This can be accomplished by using singular value decomposition (SVD) method. Because of the orthonormality, parameters $r_{31}^i$ and $r_{32}^i$ the $i^{th}$ pose of calibration pattern can also be estimated uniquely. The remaining unknown parameter $t_3^i$ is estimated in the next step along with the intrinsic parameters.

Intrinsic Parameter Estimation

Using the estimated values of $r_{11}^i, r_{12}^i, r_{21}^i, r_{22}^i, r_{31}^i, r_{32}^i, t_1^i$ and $t_2^i$ from Equations (16) and (17) for each $i^{th}$ pose, the camera intrinsic parameters $a_0, a_2, \ldots,$ and $a_N$ are estimated in the next step. The unknown parameter $t_3^i$ is also estimated for each pose of the camera calibration pattern image. Following system of equation can be written, using Equations (16) and (17), for all L points in all K poses of the calibration pattern:

$$\begin{bmatrix} A_j^1 & A_j^1\rho_j^{1^2} & \cdots & A_j^1\rho_j^{1^N} & -v_j^1 & 0 & \cdots & 0 \\ C_j^1 & C_j^1\rho_j^{1^2} & \cdots & C_j^1\rho_j^{1^N} & -u_j^1 & 0 & \cdots & 0 \\ \vdots & \vdots & \vdots & \vdots & \vdots & \vdots & \vdots & \vdots \\ A_j^K & A_j^K\rho_j^{K^2} & \cdots & A_j^K\rho_j^{K^N} & 0 & 0 & \cdots & -v_j^K \\ C_j^K & C_j^K\rho_j^{K^2} & \cdots & C_j^K\rho_j^{K^N} & 0 & 0 & \cdots & -u_j^K \end{bmatrix} \cdot \begin{bmatrix} a_0 \\ a_2 \\ \vdots \\ a_N \\ t_3^1 \\ t_3^2 \\ \vdots \\ t_3^K \end{bmatrix} = \begin{bmatrix} B_j^1 \\ D_j^1 \\ \vdots \\ B_j^K \\ D_j^K \end{bmatrix} \quad (22)$$

Where $$A_j^i = r_{21}{}^i X_j^i + r_{22}{}^i Y_j^i + t_2{}^i,$$

$$B_j^i = v_j^i(r_{31}{}^i X_j^i + r_{32}{}^i Y_j^i),$$

$$C_j^i = r_{11}{}^i X_j^i + r_{12}{}^i Y_j^i + t_1{}^i,$$

$$D_j^i = u_j^i(r_{31}{}^i X_j^i + r_{32}{}^i Y_j^i). \quad (23)$$

The intrinsic parameters $a_0, a_2, \ldots$, and $a_N$ can be estimated by a linear least square solution of above equation solved using pseudo inverse matrix method.

Linear Refinement of Intrinsic and Extrinsic Parameters

Using a further linear minimization, first refinement is performed over the estimated extrinsic and intrinsic parameters, which were obtained above. This linear refinement is carried out in following two steps:

1. The intrinsic parameters $a_0, a_2, \ldots$, and $a_N$ estimated above are used to solve the Equations (16), (17), and (18) altogether in $r_{11}, r_{12}, r_{21}, r_{22}, r_{31}, r_{32}, t_1, t_2$ and $t_3$ using singular value decomposition as a linear homogeneous system. It can be carried out only up to a certain scale factor, which is determined uniquely by exploiting orthonormality between $r_1$ and $r_2$.
2. The parameters $r_{11}, r_{12}, r_{21}, r_{22}, r_{31}, r_{32}, t_1, t_2$ and $t_3$ estimated in above step are now used to refine the intrinsic parameters $a_0, a_2, \ldots$, and $a_N$, again by solving a linear system of equations obtained in above sections using pseudo inverse-matrix method.

Center of Distortion Detection

The position of center of camera is detected using an iterative search algorithm by minimizing the sum of squared re-projection errors (SSRE). To initiate, a fixed number of potential camera center locations, uniformly distributed over the image, are selected. Calibration is using steps in the above sections is performed for each potential camera center location. Point with minimum SSRE is considered as the potential camera center. These steps are repeated for the points in the neighborhood of selected potential camera center until convergence is achieved.

Nonlinear Refinement of Intrinsic and Extrinsic Parameters

Linearly refined extrinsic and intrinsic parameters obtained above are further refined nonlinearly through maximum likelihood inference as mentioned in the OCamCalib model, assuming that the image points are corrupted by independent and identically distributed noise. In order to obtain a maximum likelihood estimate for refinement, the following function is minimized:

$$E = \sum_{i=1}^{K} \sum_{j=1}^{L} \| u_j^i - \hat{u}(R^i, T^i, A, O_c, a_0, a_2, \ldots, a_N, X_j^i) \|^2 \quad (24)$$

Here K poses of the calibration pattern are considered, each containing L corner points, and $\hat{u}(R^i, T^i, A, O_c, a_0, a_2, \ldots, a_N, X_j^i)$ is the re-projection of the $j^{th}$ scene point $X_j^i$ on $i^{th}$ pattern pose. $R^i$ and $T^i$ are the rotation and translation (position) of the $i^{th}$ pattern pose. So basically, the Equation (24) is carrying out the refinement of calibration parameters by minimizing the re-projection error.

The stretch matrix A as well as the center of distortion $O_c$ is also refined in this step. Refinement in $O_c$ is taking care of t Equation (4). First guess for the stretch matrix A is the identity matrix I, and first guess for the center of distortion $O_c$ is obtained above.

Camera Calibration Using the Taylor Model and 3D Calibration Pattern

The system described above may use a chessboard-like coplanar pattern for calibration. This planar calibration pattern is shown to camera at random positions and orientations. Contrary to a 2D calibration pattern, the below process or system formulates relations for calibrating a camera using points in a 3D calibration pattern, distributed on a (semi-) sphere, coordinates of which are known with great accuracy. Formulations for extrinsic parameters estimation are based on the algorithm presented in (see Tsai, "A versatile Camera Calibration Technique for High-Accuracy 3D Machine Vision Metrology Using Off-the-Shelf TV Cameras and Lenses," IEEE Vol. RA-3, No. 4, August 1987, which is hereby incorporated herein by reference in its entirety).

Calibration Procedure

First stage estimates the Affine parameters A, and t, and the second stages deals with the estimation of coefficients $a_0$, $a_2, \ldots$, and $a_N$. The estimation of Affine parameters A, and t is based on an iterative procedure. This procedure is initialized assuming that the camera plane and sensor plane coincides, thus the stretch matrix A is set to be an identity matrix I and the translation vector $t=0$. Correction in A is done later using a nonlinear refinement, and in t by an iterative search algorithm. With the assumptions $A=I$ and $t=0$, we have $u''=u'$. Thus the Equation (12) can be written as follows:

$$\lambda p'' = \lambda \begin{bmatrix} u' \\ v' \\ a_0 + a_2\rho'^2 + \ldots + a_N\rho'^N \end{bmatrix} = P \cdot X \quad (25)$$

Where $\rho' = |u'|$ and $(u',v')$ are the pixel coordinates of the image point u'. The calibration procedure now uses points in 3D space, coordinates of which are known with great accuracy. The positions of these points are related to the coordinate system of the sensor by a rotation matrix $R \in SO(3)$ and a translation vector $T \in \mathbb{R}^3$. R and T are the extrinsic parameters. The calibration pattern is not planar, so the z-coordinate in the 3D coordinates of the $j^{th}$ points of calibration pattern (i.e., $M_j = [X_j, Y_j, Z_j]$) is not set to zero. Assuming corresponding pixel coordinates of $j^{th}$ point of calibration pattern image I to be $m_j = [u_j, v_j]$, the Equation (25) can be rewritten as follows:

$$\lambda_j \cdot p_j = \quad (26)$$

$$\lambda_j \cdot \begin{bmatrix} u_j \\ v_j \\ a_0 + a_2\rho_j^2 + \ldots + a_N\rho_j^N \end{bmatrix} = P \cdot x_j = \begin{bmatrix} r_1 & r_2 & r_3 & T \end{bmatrix} \cdot \begin{bmatrix} X_j \\ Y_j \\ Z_j \\ 1 \end{bmatrix}$$

-continued $$[r_1 \; r_2 \; r_3 \; T] = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \quad (27)$$

Where $r_1$, $r_2$, and $r_3$ are the column vectors of $R^1$, and recall $P=[R|T]$ from the above discussions.

Extrinsic Parameter Estimation

The image center may be assumed to be $[u_c, v_c]$. Using this image center coordinate, modified pixel coordinates are computed as $[u_j', v_j'] = [u_j - u_c, v_j - v_c]$. For each calibration point $M_j = [X_j, Y_j, Z_j]$ in 3D corresponding to their 2D image points in modified pixel coordinates, following set of linear equation is formulated:

$$[v_j' \cdot X_j \;\; v_j' \cdot Y_j \;\; v_j' \cdot Z_j \;\; v_j' \;\; -u_j' \cdot X_j \;\; -u_j' \cdot Y_j \;\; -u_j' \cdot Z_j] \quad (28)$$

$$\begin{bmatrix} t_2^{-1} \cdot s_x \cdot r_{11} \\ t_2^{-1} \cdot s_x \cdot r_{12} \\ t_2^{-1} \cdot s_x \cdot r_{13} \\ t_2^{-1} \cdot s_x \cdot t_1 \\ t_2^{-1} \cdot r_{21} \\ t_2^{-1} \cdot r_{22} \\ t_2^{-1} \cdot r_{23} \end{bmatrix} = u_j'$$

Here $s_x$ is the uncertainty image scale factor. The above system of equation can be solved using pseudo inverse-matrix method for seven unknowns $a_1 = t_2^{-1} \cdot s_x \cdot r_{11}$, $a_2 = t_2^{-1} \cdot s_x \cdot r_{12}$, $a_3 = t_2^{-1} \cdot s_x \cdot r_{13}$, $a_1 = t_2^{-1} \cdot s_x \cdot r_{14}$, $a_5 = t_2^{-1} \cdot r_{21}$, $a_6 = t_2^{-1} \cdot r_{22}$ and $a_7 = t_2^{-1} \cdot r_{23}$. Although Equation (28) will have infinitely many solutions, the pseudo inverse-matrix method will give a solution with norm smaller than the norm of any other solution. Now the value for $|t_2|$ is computed using following relation:

$$|t_2| = (a_5^2 + a_6^2 + a_7^2)^{-1/2} \quad (29)$$

In order to determine the sign of $t_2$ a calibration point in the image is picked, whose coordinates $(u_j, v_j)$, are away from the center of image. Initial sign of $t_2$ is chosen as $+1$ and following variables are computed:

$$r_{11} = (r_{24}^{-1} \cdot r_{11}) \cdot t_2, \; r_{12} = (r_{24}^{-1} \cdot r_{12}) \cdot t_2 \quad (30)$$

IF u and X have the same sign, as well as v and Y have the same sign, then sign of $t_2 = +1$, ELSE sign of $t_2 = -1$. The value for $s_x$ is computed using following relation:

$$s_x = (a_1^2 + a_2^2 + a_3^2)^{-1/2} \cdot |t_2| \quad (31)$$

Knowing the values of $s_x$ (which should be equal to 1 in ideal case) and $t_2$, the values of $r_{11}$, $r_{12}$, $r_{13}$, $t_1$, $r_{21}$, $r_{22}$, and $r_{23}$ can be estimated and determined. Knowing the first two rows in the rotation matrix, the values of the elements in third row, i.e., $r_{31}$, $r_{32}$, and $r_{33}$, are computed using the orthonormal property of the rotation matrix, i.e. taking the cross product of first two rows. At this stage, we are left with $t_3$, which can be estimated along with the intrinsic parameters.

Intrinsic Parameter Estimation

Now the vector product of Equation (26) on both sides by is used to obtain:

$$\lambda_j \cdot p_j \times p_j = p_j \times [r_1 \; r_2 \; r_3 \; T] \cdot \begin{bmatrix} X_j \\ Y_j \\ Z_j \\ 1 \end{bmatrix} = 0 \quad (32)$$

$$\overset{\Delta}{=} \begin{bmatrix} u_j \\ u_j \\ a_0 + a_2 \rho_j^2 + \ldots + a_N \rho_j^N \end{bmatrix} \times [r_1 \; r_2 \; r_3 \; T] \cdot \begin{bmatrix} X_j \\ Y_j \\ Z_j \\ 1 \end{bmatrix} = 0$$

Solving Equation (32), the following three homogeneous equations are obtained:

$$v_j'(r_{31}X_j + r_{32}Y_j + r_{33}Z_j + t_3) - (a_0 + a_2 \rho_j^2 + \ldots + a_N \rho_j^N)(r_{21}X_j + r_{22}Y_j + r_{23}Z_j + t_2) = 0 \quad (33)$$

$$(a_0 + a_2 \rho_j^2 + \ldots + a_N \rho_j^N)(r_{11}X_j + r_{12}Y_j + r_{13}Z_j + t_1) - u_j'(r_{31}X_j + r_{32}Y_j + r_{33}Z_j + t_3) = 0 \quad (34)$$

$$u_j'(r_{21}X_j + r_{22}Y_j + r_{23}Z_j + t_2) - v_j'(r_{11}X_j + r_{12}Y_j + r_{13}Z_j + t_1) = 0 \quad (35)$$

Setting $r_{21}X_j + r_{22}Y_j + r_{23}Z_j + t_2 = A_j$, and $r_{11}X_j + r_{12}Y_j + r_{13}Z_j + t_1 = C_j$, Equations (33) and (34) can be rewritten as:

$$v_j'(r_{31}X_j + r_{32}Y_j + r_{33}Z_j + t_3) - (a_0 + a_2 \rho_j^2 + \ldots + a_N \rho_j^N) \cdot A_j = (a_0 + a_2 \rho_j^2 + \ldots + a_N \rho_j^N) \cdot C_j - u_j'(r_{31}X_j + r_{32}Y_j + r_{33}Z_j + t_3) \quad (36)$$

Equation (36) can be written as following system of equations:

(36)

$$[(A_j + C_j) \;\; (A_j + C_j) \cdot \rho_j^2 \;\; (A_j + C_j) \cdot \rho_j^3 \;\; \ldots \;\; (A_j + C_j) \cdot \rho_j^N \;\; -(v_j' + u_j')]$$

$$\begin{bmatrix} a_0 \\ a_2 \\ a_3 \\ \vdots \\ a_N \\ t_3 \end{bmatrix} = (v_j' + u_j') \cdot (r_{31}X_j + r_{32}Y_j + r_{33}Z_j)$$

The above system of equation can be solved using singular value decomposition (SVD) method for N+1 unknowns. Although the Eq. (36) will have infinitely many solutions, the SVD method will give a solution with norm smaller than the norm of any other solution.

But the polynomial coefficients and translation in z-direction i.e. $t_3$ in Equation (36) are coupled. So the estimate will be an ambiguous solution. In order to avoid this ambiguity, the value of $t_3$ should be known a-priory, which is doable in the proposed 3-dimensional setup. With these changes, Equation (36) is modified as follows:

(37)

$$[(A_j + C_j) \;\; (A_j + C_j) \cdot \rho_j^2 \;\; (A_j + C_j) \cdot \rho_j^3 \;\; \ldots \;\; (A_j + C_j) \cdot \rho_j^N]$$

$$\begin{bmatrix} a_0 \\ a_2 \\ a_3 \\ \vdots \\ a_N \end{bmatrix} = (v_j' + u_j') \cdot (r_{31}X_j + r_{32}Y_j + r_{33}Z_j) + (v_j' + u_j') \times t_3$$

The above system of equation can be solved using SVD method for N unknowns, which are coefficients of Taylor polynomial. By eliminating $t_3$ leads to (38) as our final equation.

Linear Refinement of Intrinsic and Extrinsic Parameters

This step may not improve accuracy any further so is not carried out in case of 3D calibration pattern.

Center of Distortion Detection

The center of distortion is detected similar to the sections above.

Nonlinear Refinement of Intrinsic and Extrinsic Parameters

Nonlinear refinement of calibration parameters is carried out similar to the above sections when necessary. The stretch matrix A as well as the center of distortion $O_c$ is also refined in this step. But using 3D calibration points, the results are already greatly improved as compared to the original OCamCalib method, thus this step can be eliminated.

Novelty of 3D Calibration Points Design

Figure 5:
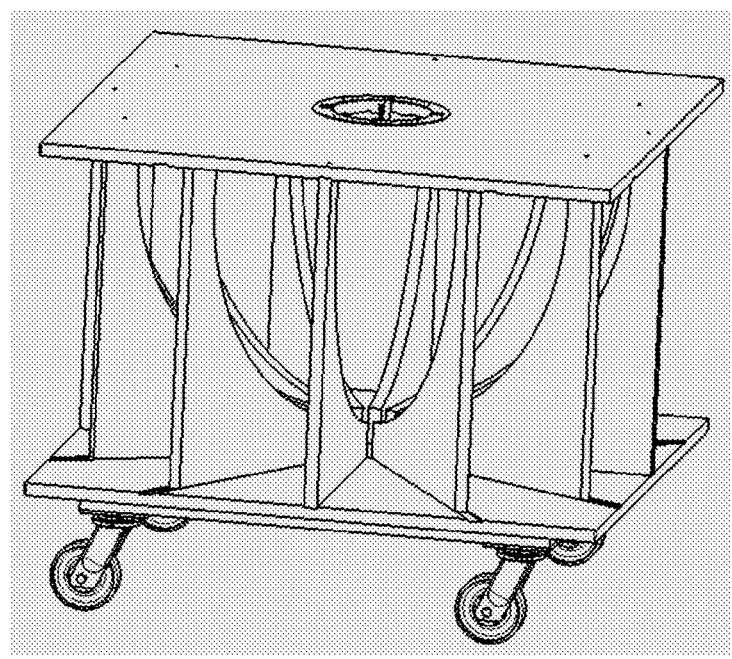
FIGS. 5 and 6 show a design of distribution of 3D calibration in space in the form of a semi-sphere in accordance with the present invention.
Figure 6:
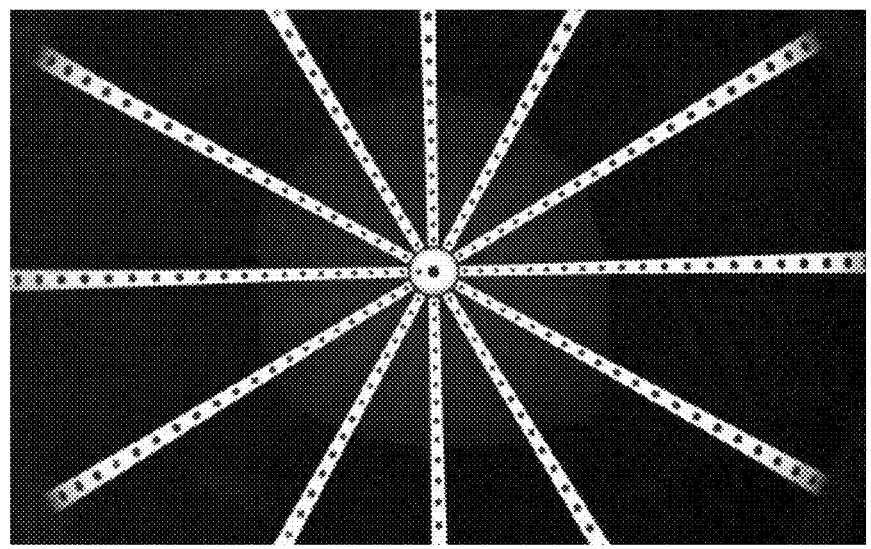
Figure 7:
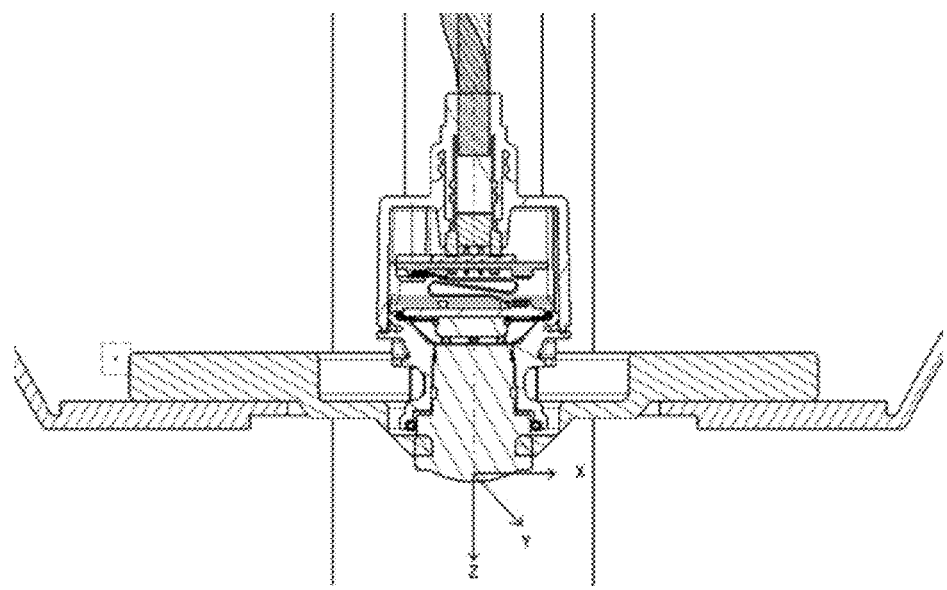
FIG. 7 shows a sectional view of a camera and lens of the vision system of the present invention.

Apart from the estimation method presented above, another novelty of invention is design of distribution of 3D calibration in space in form of a (semi-)sphere as shown in FIGS. 5 and 6. The design of FIGS. 5 and 6 provides a calibration point in space which are uniformly distributed over the entire image. This provides an opportunity to compute re-projection error over entire image thus a better estimate is achieved in Equation (36) (37).

Therefore, the present invention provides enhanced camera calibration for a vehicle vision system. It was acknowledged that using a monoview noncoplanar (3-dimensional) calibration pattern instead of a coplanar calibration pattern is beneficial to reduce the re-projection error. The equal distribution of the calibration points (equal angular distance and constant distance to the camera (radius)) is a preferred point (inserting $r_3$ in Equations (26) and (27)). Applying Tsai's formulas to estimate camera extrinsic in Scaramuzza's model and intrinsic using the present invention provides enhanced calibration. Furthermore, 3D geometry of target points leads to much more accurate principal point estimation as compared to the currently available OCamCalib model. It was possible to eliminate $t_3$ in equation (37), by that the formula was reduced to equation (38).

A 3D test pattern test bench for fish eye camera calibration was created according these mathematical insights as to be seen in FIGS. 5 and 6. Such a set up was unknown for fish eye camera calibration.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication Nos. US 2010-0020170 and/or US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, the display may utilize aspects of the displays disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:

a camera configured to be disposed at a vehicle so as to have a field of view exterior of the vehicle;

wherein said camera comprises a pixelated imaging array having a plurality of photosensing elements;

an image processor operable to process image data captured by said camera;

wherein said camera calibration comprises an estimation of extrinsic parameters and an estimation of intrinsic parameters responsive to determination of the monoview noncoplanar three dimensional calibration pattern distributed on a semi-sphere;

wherein said vision system provides camera calibration using a monoview noncoplanar three dimensional semi-spherical calibration pattern; and wherein values of distortion polynomial coefficients are estimated using three dimensional calibration points distributed on a semi-sphere by formulating the following:

$$\lambda_j \cdot p_j \times p_j = p_j \times [r_1 \ r_2 \ r_3 \ T] \cdot \begin{bmatrix} X_j \\ Y_j \\ Z_j \\ 1 \end{bmatrix} = 0$$

$$\triangleq \begin{bmatrix} u_j \\ v_j \\ a_0 + a_2 \rho_j^2 + \ldots + a_N \rho_j^N \end{bmatrix} \times [r_1 \ r_2 \ r_3 \ T] \cdot \begin{bmatrix} X_j \\ Y_j \\ Z_j \\ 1 \end{bmatrix} = 0$$

wherein $l$ is an arbitrary depth scale factor, $p_j$ is a point in the field of view of said camera, $r_1$, $r_2$, $r_3$ are column vectors of the rotation of the $i^{th}$ pattern pose, T is a translation vector, X, Y, Z are world coordinates of a scene point, coefficients $a_0$, $a_1$, $a_2$, ... $a_N$ are distortion parameter coefficients, and coefficient $r_j$ is a point at an imaging plane of said camera where the vector of point pj is mapped, and u, v are the pixel coordinates of an image point.

2. The vision system of claim 1, wherein said camera comprises a fish eye lens.

3. The vision system of claim 1, wherein the values of distortion polynomial coefficients are estimated by reducing the formation to obtain:

$v'_j(r_{31}X_j+r_{32}Y_j+r_{33}Z_j+t_3)-(a_0+a_2\rho_j^2+\ldots+a_N\rho_j^N)(r_{21}X_j+r_{22}Y_j+r_{23}Z_j+t_2)=0$ $(a_0+a_2\rho_j^2+\ldots+a_N\rho_j^N)(r_{11}X_j+r_{12}Y_j+r_{13}Z_j+t_1)-u'_j(r_{31}X_j+r_{32}Y_j+r_{33}Z_j+t_3)=0$ $u'_j(r_{21}X_j+r_{22}Y_j+r_{23}Z_j+t_2)-v'_j(r_{11}X_j+r_{12}Y_j+r_{13}Z_j+t_1)=0$ wherein $r_{ij}$ and $t_i$ are unknown parameters.

4. The vision system of claim 3, wherein the values of distortion polynomial coefficients are estimated by solving the equations to obtain a formulation for distortion polynomial coefficients:

$$[(A_j+C_j) \ (A_j+C_j)\cdot \rho_j^2 \ (A_j+C_j)\cdot \rho_j^3 \ \ldots \ (A_j+C_j)\cdot \rho_j^N \ -(v_j'+u_j')]$$

$$\begin{bmatrix} a_0 \\ a_2 \\ a_3 \\ \vdots \\ a_N \\ t_3 \end{bmatrix} = (v_j'+u_j')\cdot(r_{31}X_j + r_{32}Y_j + r_{33}Z_j)$$

wherein $A_j$ is $r_{21}X_j+r_{22}Y_j+r_{23}Z_j+t_2$ of the equation of claim 3, and $Cj$ is $r_{11}X_j+r_{12}Y_j+r_{13}Z_j+t_1$ of the equation of claim 3.

5. The vision system of claim 4, wherein, by providing knowledge about $t_3$ will give an unambiguous solution for distortion polynomial, by setting $t_3$ to zero and reducing to following final equation:

$$[(A_j+C_j) \ (A_j+C_j)\cdot \rho_j^2 \ (A_j+C_j)\cdot \rho_j^3 \ \ldots \ (A_j+C_j)\cdot \rho_j^N]$$

$$\begin{bmatrix} a_0 \\ a_2 \\ a_3 \\ \vdots \\ a_N \end{bmatrix} = (v_j'+u_j')\cdot(r_{31}X_j + r_{32}Y_j + r_{33}Z_j) + (v_j'+u_j')\times t_3$$

wherein $a_0, a_1, a_2, \ldots a_N$ are distortion parameter coefficients.

6. A vision system of a vehicle, said vision system comprising:

a camera configured to be disposed at a vehicle so as to have a field of view exterior of the vehicle;

wherein said camera comprises a pixelated imaging array having a plurality of photosensing elements;

an image processor operable to process image data captured by said camera;

wherein said vision system provides camera calibration using a monoview noncoplanar three dimensional semi-spherical calibration pattern; and wherein an equal distribution of calibration points having equal angular distance and constant distance to the camera is a preferred point for a value $r_3$ in:

$$\lambda_j \cdot p_j = \lambda_j \cdot \begin{bmatrix} u_j \\ v_j \\ a_0 + a_2\rho_j^2 + \ldots + a_N\rho_j^N \end{bmatrix} = P\cdot X_j = [r_1 \ r_2 \ r_3 \ T]\cdot \begin{bmatrix} X_j \\ Y_j \\ Z_j \\ 1 \end{bmatrix}$$

$$[r_1 \ r_2 \ r_3 \ T] = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}$$

wherein l is an arbitrary depth scale factor, $p_j$ is a point in the field of view of said camera, P is the projection matrix that relates the reference frame of said camera and the world reference frame, $r_1$, $r_2$ and $r_3$ are column vectors of the rotation of the $i^{th}$ pattern pose, T is a translation vector, X, Y, Z are world coordinates of a scene point, coefficients $a_0, a_1, a_2, \ldots a_N$ are distortion parameter coefficients, and coefficient $r_j$ is a point at an imaging plane of said camera where the vector of point $p_j$ is mapped, u, v are the pixel coordinates of an image point, and $r_{ij}$ and $t_i$ are unknown parameters.

7. The vision system of claim 6, comprising a plurality of cameras configured to be disposed at a vehicle so as to have respective fields of view exterior of the vehicle.

8. The vision system of claim 7, wherein said plurality of cameras comprises (i) a forward viewing camera disposed at the vehicle so as to have a forward field of view forward of the vehicle, (ii) a rearward viewing camera disposed at the vehicle so as to have a rearward field of view rearward of the vehicle, (iii) a driver side viewing camera disposed at the vehicle so as to have a sideward field of view sideward of a driver side of the vehicle, and (iv) a passenger side viewing camera disposed at the vehicle so as to have a sideward field of view sideward of a passenger side of the vehicle.

9. A vision system of a vehicle, said vision system comprising:

a camera configured to be disposed at a vehicle so as to have a field of view exterior of the vehicle, wherein said camera comprises a fish eye lens;

wherein said camera comprises a pixelated imaging array having a plurality of photosensing elements;

an image processor operable to process image data captured by said camera;

wherein said vision system provides camera calibration using a monoview noncoplanar three dimensional semi-spherical calibration pattern;

wherein said camera calibration comprises an estimation of extrinsic parameters and an estimation of intrinsic parameters responsive to determination of the monoview noncoplanar three dimensional calibration pattern distributed on a semi-sphere; and wherein values of distortion polynomial coefficients are estimated using three dimensional calibration points distributed on a semi-sphere by formulating the following:

$$\lambda_j \cdot p_j \times p_j = p_j \times [r_1 \ r_2 \ r_3 \ T]\cdot \begin{bmatrix} X_j \\ Y_j \\ Z_j \\ 1 \end{bmatrix} = 0$$

$$\triangleq \begin{bmatrix} u_j \\ u_j \\ a_0 + a_2\rho_j^2 + \ldots + a_N\rho_j^N \end{bmatrix} \times [r_1 \ r_2 \ r_3 \ T]\cdot \begin{bmatrix} X_j \\ Y_j \\ Z_j \\ 1 \end{bmatrix} = 0$$

wherein l is an arbitrary depth scale factor, $p_j$ is a point in the field of view of said camera, $r_1$, $r_2$, $r_3$ are column vectors of the rotation of the $i^{th}$ pattern pose, T is a translation vector, X, Y, Z are world coordinates of a scene point, coefficients an are estimated calibration parameters, and coefficient r is a point at an imaging plane of said camera where the vector of point pj is mapped, and u, v are the pixel coordinates of an image point.

10. The vision system of claim 9, wherein the values of distortion polynomial coefficients are estimated by reducing the formation to obtain:

$$v'_j(r_{31}X_j+r_{32}Y_j+r_{33}Z_j+t_3)-(a_0+a_2\rho_j^2+\ldots+a_N\rho_j^N)(r_{21}X_j+r_{22}Y_j+r_{23}Z_j+t_2)=0$$

$$(a_0+a_2\rho_j^2+\ldots+a_N\rho_j^N)(r_{11}X_j+r_{12}Y_j+r_{13}Z_j+t_1)-u'_j(r_{31}X_j+r_{32}Y_j+r_{33}Z_j+t_3)=0$$

$$u'_j(r_{21}X_j+r_{22}Y_j+r_{23}Z_j+t_2)-v'_j(r_{11}X_j+r_{12}Y_j+r_{13}Z_j+t_1)=0$$

wherein $A_j$ is $r_{21}X_j+r_{22}Y_j+r_{23}Z_j+t_2$ of the equation of claim 9, and Cj is $r_{11}X_j+r_{12}Y_j+r_{13}Z_j+t_1$ of the equation of claim 9.

11. The vision system of claim 10, wherein the values of distortion polynomial coefficients are estimated by and solving the equations to obtain a formulation for distortion polynomial coefficients:

$$[(A_j+C_j)\ (A_j+C_j)\cdot\rho_j^2\ (A_j+C_j)\cdot\rho_j^3\ \ldots\ (A_j+C_j)\cdot\rho_j^N\ -(v'_j+u'_j)]\begin{bmatrix}a_0\\a_2\\a_3\\\vdots\\a_N\\t_3\end{bmatrix}=(v'_j+u'_j)\cdot(r_{31}X_j+r_{32}Y_j+r_{33}Z_j).$$

12. The vision system of claim 11, wherein, by providing knowledge about $t_3$ will give an unambiguous solution for distortion polynomial, by setting $t_3$ to zero and reducing to following final equation:

$$[(A_j+C_j)\ (A_j+C_j)\cdot\rho_j^2\ (A_j+C_j)\cdot\rho_j^3\ \ldots\ (A_j+C_j)\cdot\rho_j^N]\begin{bmatrix}a_0\\a_2\\a_3\\\vdots\\a_N\end{bmatrix}=(v'_j+u'_j)\cdot(r_{31}X_j+r_{32}Y_j+r_{33}Z_j)+(v'_j+u'_j)\times t_3$$

wherein $a_0, a_1, a_2, \ldots a_N$ are distortion parameter coefficients.

13. A vision system of a vehicle, said vision system comprising:
a camera configured to be disposed at a vehicle so as to have a field of view exterior of the vehicle, wherein said camera comprises a fish eye lens;
wherein said camera comprises a pixelated imaging array having a plurality of photosensing elements;
an image processor operable to process image data captured by said camera;
wherein said vision system provides camera calibration using a monoview noncoplanar three dimensional semi-spherical calibration pattern;
wherein said camera calibration comprises an estimation of extrinsic parameters and an estimation of intrinsic parameters responsive to determination of the monoview noncoplanar three dimensional calibration pattern distributed on a semi-sphere;
wherein an equal distribution of calibration points having equal angular distance and constant distance to the camera is a preferred point for a value $r_3$ in:

$$\lambda_j\cdot p_j=\lambda_j\cdot\begin{bmatrix}u_j\\v_j\\a_0+a_2\rho_j^2+\ldots+a_N\rho_j^N\end{bmatrix}=P\cdot X_j=[r_1\ r_2\ r_3\ T]\cdot\begin{bmatrix}X_j\\Y_j\\Z_j\\1\end{bmatrix}$$

$$[r_1\ r_2\ r_3\ T]=\begin{bmatrix}r_{11}&r_{12}&r_{13}&t_1\\r_{21}&r_{22}&r_{23}&t_2\\r_{31}&r_{32}&r_{33}&t_3\end{bmatrix}$$

wherein l is an arbitrary depth scale factor, $p_j$ is a point in the field of view of said camera, P is the projection matrix that relates the reference frame of said camera and the world reference frame, $r_1$, $r_2$ and $r_3$ are column vectors of the rotation of the $i^{th}$ pattern pose, T is a translation vector, X, Y, Z are world coordinates of a scene point, coefficients $a_0, a_1, a_2, \ldots a_N$ are distortion parameter coefficients, and coefficient $r_j$ is a point at an imaging plane of said camera where the vector of point $p_j$ is mapped, u, v are the pixel coordinates of an image point, and $r_{ij}$ and $t_i$ are unknown parameters.

14. A vision system of a vehicle, said vision system comprising:
a plurality of cameras configured to be disposed at a vehicle so as to have respective fields of view exterior of the vehicle, wherein at least one camera of said plurality of cameras comprises a fish eye lens;
wherein each of said cameras comprises a pixelated imaging array having a plurality of photosensing elements;
an image processor operable to process image data captured by said at least one camera;
wherein said vision system provides camera calibration of said at least one camera using a monoview noncoplanar three dimensional semi-spherical calibration pattern; and
wherein an equal distribution of calibration points having equal angular distance and constant distance to the camera is a preferred point for a value $r_3$ in:

$$\lambda_j\cdot p_j=\lambda_j\cdot\begin{bmatrix}u_j\\v_j\\a_0+a_2\rho_j^2+\ldots+a_N\rho_j^N\end{bmatrix}=P\cdot X_j=[r_1\ r_2\ r_3\ T]\cdot\begin{bmatrix}X_j\\Y_j\\Z_j\\1\end{bmatrix}$$

$$[r_1\ r_2\ r_3\ T]=\begin{bmatrix}r_{11}&r_{12}&r_{13}&t_1\\r_{21}&r_{22}&r_{23}&t_2\\r_{31}&r_{32}&r_{33}&t_3\end{bmatrix}$$

wherein l is an arbitrary depth scale factor, $p_j$ is a point in the field of view of said camera, $r_1$, $r_2$ and $r_3$ are column vectors of the rotation of the $i^{th}$ pattern pose, T is a translation vector, X, Y, Z are world coordinates of a scene point, coefficients $a_0, a_1, a_2, \ldots a_N$ are distortion parameter coefficients, and coefficient $r_j$ is a point at an imaging plane of said camera where the vector of point $p_j$ is mapped, u, v are the pixel coordinates of an image point, and $r_{ij}$ and $t_i$ are unknown parameters.

15. The vision system of claim 14, wherein said camera calibration comprises an estimation of extrinsic parameters and an estimation of intrinsic parameters responsive to determination of the monoview noncoplanar three dimensional calibration pattern distributed on a semi-sphere.

16. The vision system of claim 14, wherein said plurality of cameras comprises (i) a forward viewing camera disposed at the vehicle so as to have a forward field of view forward of the vehicle, (ii) a rearward viewing camera disposed at the vehicle so as to have a rearward field of view rearward of the vehicle, (iii) a driver side viewing camera disposed at the vehicle so as to have a sideward field of view sideward of a driver side of the vehicle, and (iv) a passenger side viewing camera disposed at the vehicle so as to have a sideward field of view sideward of a passenger side of the vehicle, and wherein said image processor is operable to process image data captured by said cameras, and wherein said vision system provides camera calibration of said cameras using said monoview noncoplanar three dimensional semi-spherical calibration pattern.

* * * * *

UNITED STATES PATENT AND TRADEMARK OFFICE
CERTIFICATE OF CORRECTION

PATENT NO.        : 9,916,660 B2
APPLICATION NO.   : 14/996571
DATED             : March 13, 2018
INVENTOR(S)       : Jagmal Singh et al.

Page 1 of 1

It is certified that error appears in the above-identified patent and that said Letters Patent is hereby corrected as shown below:

In the Specification

Column 1
Line 48, "plane 7" should be -- plane $\pi$ --

Column 5

Lines 55-59, the equation "$\lambda_j^i \cdot p_j^i = \lambda_j^i \cdot \begin{bmatrix} u_j^i \\ v_j^i \\ a_0 + a_2 \rho_j^{i2} + \cdots + a_N \rho_j^{iN} \end{bmatrix}$" should be -- $\lambda_j^i \cdot p_j^i = \lambda_j^i \cdot \begin{bmatrix} u_j^i \\ v_j^i \\ a_0 + a_2 \rho_j^{iN} + \ldots + a_N \rho_j^{iN} \end{bmatrix} =$ --

Column 6

Line 2, "scale is eliminated" should be -- scale $\lambda_j^i$ is eliminated --
Line 34, "M·H=0.(19)" should be -- M · H = 0 --

Column 9

Lines 66-67, "by is used" should be -- by $p_j^i$ is used --

Signed and Sealed this
Sixth Day of November, 2018

Andrei Iancu
*Director of the United States Patent and Trademark Office*